(12) United States Patent
Cao

US008537678B2

(10) Patent No.: US 8,537,678 B2
(45) Date of Patent: Sep. 17, 2013

(54) MMS (MULTIMEDIA MESSAGING SERVICE) DECODING METHOD, MMS DECODER AND MOBILE TERMINAL

(75) Inventor: Gang Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 96 days.

(21) Appl. No.: 13/257,931

(22) PCT Filed: Dec. 11, 2009

(86) PCT No.: PCT/CN2009/075519
§ 371 (c)(1),
(2), (4) Date: Sep. 20, 2011

(87) PCT Pub. No.: WO2011/017872
PCT Pub. Date: Feb. 17, 2011

(65) Prior Publication Data
US 2012/0157133 A1    Jun. 21, 2012

(30) Foreign Application Priority Data
Aug. 14, 2009  (CN) .......................... 2009 1 0109401

(51) Int. Cl.
*H04J 1/16*  (2006.01)
(52) U.S. Cl.
USPC ........ 370/232; 370/235.1; 370/469; 370/474; 370/476; 709/204; 709/246
(58) Field of Classification Search
USPC ................. 370/230–237, 252, 464, 469, 474, 370/476; 709/246
See application file for complete search history.

(56) References Cited

U.S. PATENT DOCUMENTS 8,019,894 B2 *   9/2011   Lin et al. ........................ 709/246
8,116,790 B2 *   2/2012   Kim ............................... 455/466
(Continued)

FOREIGN PATENT DOCUMENTS

| CN | 1767539 A | 5/2006 |
| CN | 101193337 A | 6/2008 |
| CN | 101287195 A | 10/2008 |
| KR | 20090021890 A | 3/2009 |

OTHER PUBLICATIONS

International Search Report on international application No. PCT/CN2009/075519, mailed on May 13, 2010.

(Continued)

*Primary Examiner* — Jeffrey M Rutkowski
*Assistant Examiner* — Rasha Fayed
(74) *Attorney, Agent, or Firm* — Oppedahl Patent Law Firm LLC

(57) ABSTRACT

The present disclosure discloses a multimedia messaging service (MMS) decoding method, an MMS decoder and a mobile terminal. The method comprises the steps of: parsing an original MMS data packet, acquiring all the non-SMIL (synchronized multimedia integration language) files in it, and counting the number of all the non-SMIL files as the first non-SMIL file number; determining whether an SMIL file exists in the parsing result, if yes, pre-parsing the SMIL file, obtaining the number of the non-SMIL files described by the SMIL file, and counting the number as the second non-SMIL file number, comparing the first non-SMIL file number with the second non-SMIL file number to obtain the formal SMIL file to be parsed; integrally parsing the formal SMIL file to be parsed, obtaining the data structure describing the playing layout of MMS, and taking the data structure and all the non-SMIL files obtained in step A as the MMS decoding result. The present disclosure improves the MMS decoding effect and the user experience.

36 Claims, 2 Drawing Sheets

(56) References Cited

U.S. PATENT DOCUMENTS

| | | | |
|---|---|---|---|
| 8,160,550 B2 * | 4/2012 | Oh | 455/412.2 |
| 2004/0243674 A1 * | 12/2004 | Lu | 709/204 |
| 2006/0156218 A1 * | 7/2006 | Lee | 715/500.1 |
| 2009/0088191 A1 * | 4/2009 | Norton et al. | 455/466 |
| 2010/0029335 A1 * | 2/2010 | Vartanian | 455/566 |

OTHER PUBLICATIONS

English Translation of the Written Opinion of the International Search Authority in international application No. PCT/CN2009/075519, mailed on May 13, 2010.

* cited by examiner

MMS (MULTIMEDIA MESSAGING SERVICE) DECODING METHOD, MMS DECODER AND MOBILE TERMINAL

TECHNICAL FIELD

The present disclosure relates to the field of mobile communications, and in particular to a Multimedia Messaging Service (MMS) decoding method, an MMS decoder and a mobile terminal.

BACKGROUND

MMS is a service launched by mobile operators for transmitting multimedia short messages with Wireless Application Protocol (WAP) as a carrier and has the features of supporting multimedia function and being capable of transmitting information of various multimedia formats including text, image, voice and video. MMS can realize instant multimedia information transmission from a mobile phone terminal to a mobile phone terminal, or from a mobile phone terminal to internet or from internet to a mobile phone terminal. Compared with previous common short messages, the MMS can not only is provide basic text information but also abundant multimedia contents, such as color images, voices, animations, vibrations and videos, for example, the MMS can be provide application contents, such as sports news with on-the-scene images, interesting cartoons, greeting cards with rich contents and wonderful animated games. In addition, the MMS can contain any other types of files such as a name card holder file, as an email does.

The MMS application at a mobile phone terminal mainly includes a plurality of core modules, such as an MMS message receiving/transmitting module, an MMS message management module, an MMS encoding module, an MMS decoding module and an MMS playing module, wherein the MMS decoding module is configured for decoding an MMS data file downloaded by a mobile phone user and saved to the mobile phone, then the decoded result is transmitted to a player to play, in this way, multimedia units, such as texts, images, voices and videos, or other types of file attachments included in the MMS message are displayed to the mobile phone user. Generally, MMS decoding mainly comprises two steps: the first step is decoding and segmenting an original data packet according to an MMS protocol to obtain a sequence of multimedia files or other types of files packaged into the data packet, wherein the file sequence generally contains a key Synchronized Multimedia Integration Language (SMIL) file which describes the layout structure of the multimedia units, such as texts, images, voices and videos, or other types of attachment elements, in MMS playing; and the second step is parsing the content of the SMIL file, obtaining the layout order of playing specific MMS contents and accordingly constructing a slide structure which is to be transmitted to the player to play. However, in actual use, mobile phones of different models have different styles in MMS data encoding and packaging before sending the MMS, mainly having the following cases:

the data packet contains an SMIL file, and the SMIL file has layout descriptions for all the other files in the data packet;

the data packet contains an SMIL file, but the SMIL file does not have a layout is description for some of all the other files in the data packet;

the data packet does not have an SMIL file.

Since encoding has a plurality of styles, if a conventional decoding flow is adopted, partial file information might be lost or not all the MMS contents can be displayed to users dynamically like slides.

SUMMARY

In view of this, the present disclosure aims to provide an MMS decoding method which can adapt to different MMS encoding styles so as to improve the MMS decoding smartness. The present disclosure also provides an MMS decoder and a mobile terminal accordingly.

In order to solve the technical problem above, the present disclosure adopts the following technical solutions.

An MMS decoding method includes the following steps of:

A: parsing an original MMS data packet, acquiring all the non-SMIL files in the original MMS data packet, and counting the number of all the non-SMIL files as a first non-SMIL file number;

B: determining whether an SMIL file exists in the parsing result, if there exists an SMIL file, then pre-parsing the SMIL file, obtaining the number of non-SMIL files described by the SMIL file, counting the number as a second non-SMIL file number, and executing step C; otherwise, executing step D;

C: determining whether the first non-SMIL file number is equal to the second non-SMIL file number, if they are equal, then taking the SMIL file in the parsing result as a formal SMIL file to be parsed, and executing step E; otherwise, executing step D;

D: constructing an SMIL file according to all the non-SMIL files obtained in step A and taking the constructed SMIL file as a formal SMIL file to be parsed;

E: integrally parsing the formal SMIL file to be parsed, obtaining a data structure describing a playing layout of MMS, taking the obtained data structure and all the non-SMIL files obtained in step A as an MMS decoding result.

Further, the step A may specifically include:

A1: parsing an original MMS data packet and acquiring all the files in the original MMS data packet; every time a file is acquired, determining the file format by checking a content-type field of the file and saving the file into a file body of a corresponding format;

A2: acquiring all the non-SMIL files in the parsing result and counting the number of all the non-SMIL files as a first non-SMIL file number.

Further, the file format may include one or more formats selected from the group consisting of a text format, an image format, an audio format, a video format and an attachment format.

Further, in the step D, the constructing an SMIL file according to all the non-SMIL files obtained in step A may be carried out in the following way:

D1: determining a construction principle of an SMIL file, wherein the construction principle includes: only one file of one file format can exist in a frame; a video file or an attachment file can only coexist with a text file in a frame;

D2: constructing an SMIL file describing a playing layout of all the non-SMIL files according to the construction principle.

Further, for the non-SMIL files of different file formats, their respective file bodies are of list structures; all the non-SMIL file lists of different file formats are combined into a non-SMIL file sequence.

Further, the data structure describing a playing layout of MMS may be a slide sequence structure.

Based on the method above, the present disclosure also provides an MMS decoder, including:

a file parsing module configured for parsing an original MMS data packet, acquiring all the non-SMIL files in the original MMS data packet and counting the number of all the is non-SMIL files as a first non-SMIL file number;

an SMIL pre-parsing module configured for determining whether an SMIL file exists in a parsing result, if an SMIL file exists, then pre-parsing the SMIL file, obtaining the number of non-SMIL files described by the SMIL file and counting the number as a second non-SMIL file number; if no SMIL file exists, then setting the second non-SMIL file number as zero;

an SMIL decision unit configured for comparing the first non-SMIL file number with the second non-SMIL file number, and taking the SMIL file in the parsing result as a formal SMIL file to be parsed if the two numbers are equal;

an SMIL file reconstruction unit configured for, if the first non-SMIL file number and the second non-SMIL file number are not equal, constructing an SMIL file according to all the non-SMIL files obtained in the file parsing module, and taking the constructed SMIL file as a formal SMIL file to be parsed;

an MMS decoding output module configured for integrally parsing the formal SMIL file to be parsed, obtaining a data structure describing a playing layout of MMS, and taking the obtained data structure and all the non-SMIL files obtained in the file parsing module as an MMS decoding result.

Further, the file parsing module may include:

a parsing processing unit configured for parsing an original MMS data packet, and every time a file is acquired, determining the file format thereof by checking the content-type field of the file and saving the file into a file body of a corresponding format;

a non-SMIL file acquisition unit configured for acquiring all the non-SMIL files in a parsing result and counting the number of all the non-SMIL files as a first non-SMIL file number.

Further, the file format may include one or more formats selected from the group consisting of a text format, an image format, an audio format, a video format and an attachment format.

Based on the MMS decoder provided by the present disclosure, the present disclosure also provides a mobile terminal including the MMS decoder mentioned above.

Compared with the prior art, the present disclosure has the following advantages:

it is determined whether to reconstruct an SMIL file by comparing the first non-SMIL file number with the second non-SMIL file number, therefore, the whole process is simple and quick; besides, through such a determination process, an SMIL file is reconstructed only when a reconstruction is needed, thus improving the processing efficiency;

when an SMIL file exists, the second non-SMIL file number is obtained by pre-parsing the SMIL file, wherein the pre-parsing is a partial parsing which is performed for the SMIL file and just needs to acquire the total number information of the non-SMIL files described by the SMIL; therefore, the speed of parsing an SMIL file can be improved.

The formal SMIL file to be parsed describes the playing layout structure of all the non-SMIL files, thus avoiding the defects that partial file information might be lost or not all the MMS contents can be displayed to a user dynamically like slides; therefore, the effect of MMS decoding and the user experience are improved.

DETAILED DESCRIPTION

The specific implementation of the present disclosure is described in details below in combination with the accompanying drawings.

The main purpose of the present disclosure is: in view of the case that mobile terminals of various models have different data encoding styles at present when sending an MMS message, a method, which combines SMIL pre-parsing processing, SMIL adaptive selection, SMIL reconstruction and other technologies together, is adopted, so as to avoid the defects existing in the prior art that partial file information might be lost or not all the MMS contents can be displayed to users dynamically like slides, enable an terminal MMS application to have extremely high smartness and obviously improve the user experience.

Figure 1:
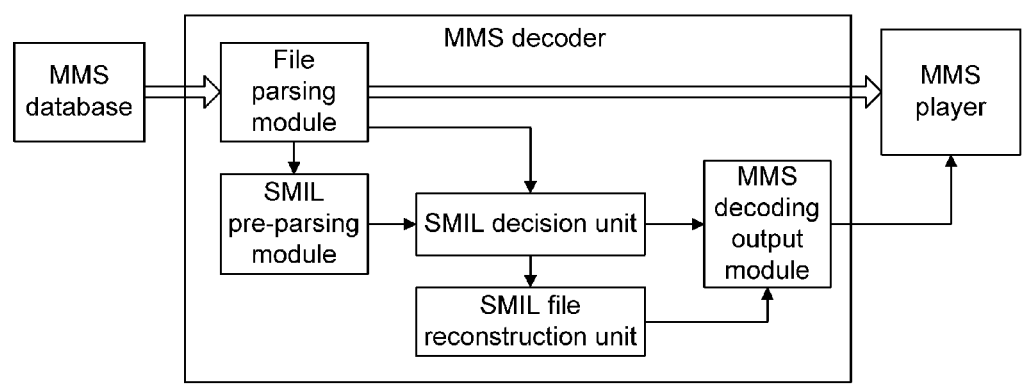
FIG. 1 illustrates the integral structure of an MMS decoder according to the present disclosure by an example.

As shown in FIG. 1, an MMS decoder according to one embodiment of the present disclosure mainly includes: a file parsing module, an SMIL pre-parsing module, an SMIL decision unit, an SMIL file reconstruction unit and an MMS decoding output module, wherein the function of each module is as follows:

the file parsing module is configured for parsing an original MMS data packet, acquiring all the non-SMIL files in the original MMS data packet and counting the number of all the non-SMIL files as a first non-SMIL file number;

the file parsing module further includes a parsing processing unit and a non-SMIL file acquisition unit (not shown in the figure), wherein the parsing processing unit is configured for acquiring an original MMS data packet from an MMS database and parsing the original MMS data packet, when a file is acquired each time, determining the format of the file by checking the content-type field of the file and saving the file into a file body of a corresponding format; and the non-SMIL file acquisition unit is configured for acquiring all the non-SMIL files from the parsing result of the parsing processing unit and counting the number of all the non-SMIL files as the first non-SMIL file number;

the SMIL pre-parsing module is configured for determining whether an SMIL file exists in the parsing result of the file parsing module, if an SMIL file exists, then pre-parsing the SMIL file, obtaining the number of the non-SMIL files described by the SMIL file and counting the number as a second non-SMIL file number; if no SMIL file exists in the parsing result, then setting the second non-SMIL file number as zero;

the SMIL decision unit is configured for comparing the first non-SMIL file number is with the second non-SMIL file number, and taking the SMIL file in the parsing result as a formal SMIL file to be parsed if the two file numbers are equal;

the SMIL file reconstruction unit is configured for, if the first non-SMIL file number and the second non-SMIL file number are not equal, constructing an SMIL file according to all the non-SMIL files obtained from the file parsing module, and taking the constructed SMIL file as a formal SMIL file to be parsed;

the MMS decoding output module is configured for, when the formal SMIL file to be parsed is output to the MMS decoding output module after the pre-parsing by the SMIL pre-parsing module, the adaptive SMIL file selection and the SMIL reconstruction, integrally parsing the formal SMIL file to be parsed, obtaining a data structure describing the playing layout of MMS, taking the obtained data structure and all the non-SMIL files obtained from the file parsing module as an MMS decoding result and then outputting the MMS decoding result to an MMS player to play. All the non-SMIL files can be directly output to the MMS player from the file parsing module, or can be output to the MMS decoding output module first to be combined with the data structure describing the playing layout of MMS and then output to the MMS player.

The MMS decoder above can be integrated into a mobile terminal which may be a mobile phone terminal, a PDA apparatus and the like. Of course, the MMS decoder also can be separated from a mobile terminal, for example, the MMS decoder can be integrated into a PC, or can be an independent MMS decoding apparatus which, after receiving and decoding an MMS, transmits the MMS to a mobile terminal to play by a wire or wireless communication method.

Figure 2:
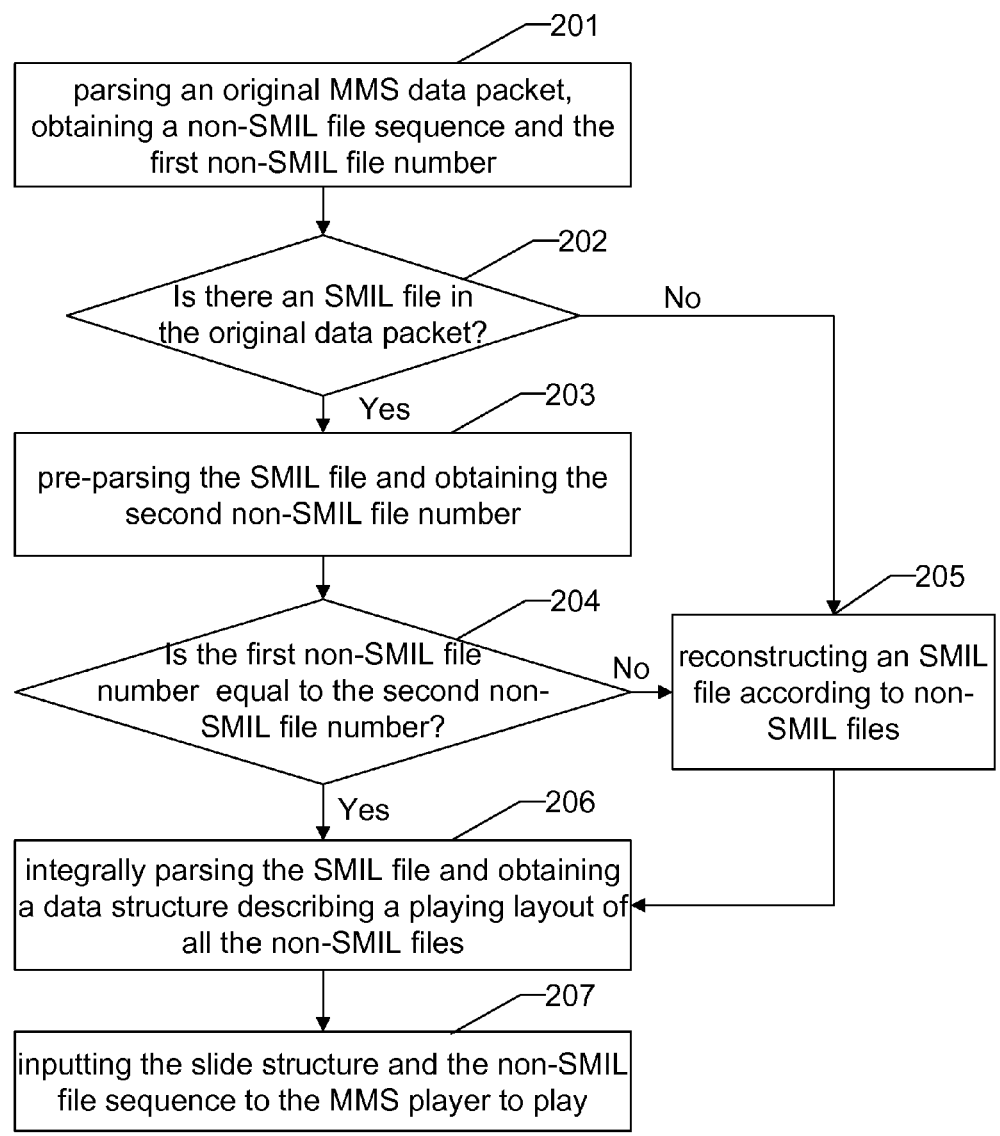
FIG. 2 illustrates an MMS decoding flow according to the present disclosure by an example.

As shown in FIG. 2, a decoding method flow according to one embodiment of the present disclosure includes the following steps:

step 201: acquiring an original MMS data packet from an MMS database and parsing the original MMS data packet according to an MMS file format to obtain a file sequence, wherein the file sequence contains all the media files (text, image, audio and video) and other types of attachments included in the MMS; checking whether an SMIL file is contained in the file sequence, if it is contained, extracting the SMIL file from the file is sequence, and thereby forming a file sequence containing all the non-SMIL files, wherein the non-SMIL file sequence may contain files of one or more formats selected from the group consisting of a text format, an image format, an audio format, a video format and an attachment format; the files of various formats can be saved into file bodies of corresponding formats, respectively; at the same time, counting the number of the files in the non-SMIL file sequence and defining it as a first non-SMIL file number;

step 202: determining whether an SMIL file exists in the original data packet, if it exists, executing step 203; otherwise, executing step 205;

step 203: pre-parsing the SMIL file in the original data packet, and obtaining a second non-SMIL file number;

wherein the pre-parsing is such a parsing which does not completely parse the content of the SMIL file but quickly counts the number of all the non-SMIL files described in the SMIL file and defines the number as a second non-SMIL file number;

step 204: determining whether the first non-SMIL file number is equal to the second non-SMIL file number, if they are equal, outputting the SMIL file parsed and extracted from the original data packet and taking it as a formal SMIL file to be parsed, and then executing step 206; otherwise, executing step 205;

step 205: constructing a new SMIL file according to information of the non-SMIL file sequence obtained in step 201 and taking the new SMIL file as a formal SMIL file to be parsed;

step 206: integrally parsing the formal SMIL file to be parsed to obtain a data structure describing the playing layout of all the non-SMIL files; and step 207: transmitting the data structure describing the playing layout of all the non-SMIL files together with the file sequence containing all the non-SMIL files obtained in step 201 to an MMS player to play.

An example is provided below for further describing the decoding method of the embodiment of the present disclosure, taking a mobile terminal integrated with the above MMS decoder for example, the mobile terminal receives an MMS and saves the MMS is into an inbox (an MMS database), and then performs the following MMS decoding before playing the MMS:

step 1: when a mobile terminal user selects to open an MMS in the inbox, firstly inputting an original data packet of mms format corresponding to the MMS to the MMS decoder which first acquires all the files contained in MMS bodies in the data packet through MMS protocol, and then, every time a file is acquired, examines the corresponding content-type field of the file and processes the file in detail based on the following conditions:

1) if content-type is "application/smil", saving the file into an SMIL file;

2) if content-type begins with "text/", saving the file into a text list;

3) if content-type begins with "image/", saving the file into an image list;

4) if content-type begins with "audio/", saving the file into an audio list;

5) if content-type begins with "video/", saving the file into a video list; and 6) if content-type is other type, saving the file into an attachment list;

through the above processes, the text list, image list, audio list, video list and attachment list are combined into a non-SMIL file sequence;

step 2: if no SMIL is detected in step 1, directly entering to step 4, otherwise, quickly pre-parsing the SMIL file, wherein in the pre-parsing process, only the files described under the tag <par> are counted, and thus the number of all the non-SMIL files described by the SMIL is obtained;

step 3: comparing the number of the files contained in the non-SMIL file sequence (the first non-SMIL file number) obtained in step 1 with the number of the non-SMIL files described by the SMIL carried by an MMS itself (the second non-SMIL file number) obtained in step 2, if the two numbers are equal, directly outputting the SMIL file carried by the MMS itself and entering into step 5, otherwise, entering into the next step to process;

step 4: constructing a new SMIL file to describe the playing layout of the MSS is according to information of the non-SMIL file sequence obtained in step 1; wherein the SMIL is constructed based on the following construction principle:

the general construction principle is:

(1) only one file of one file format can exist in a frame;

(2) a video file or an attachment file can only coexist with a text file in a frame.

The specific construction principle of an SMIL file in an embodiment of the present disclosure includes:

1) a frame can include only one image, but can not include multiple images;

2) a frame can include only one audio, but can not include multiple audios;

3) a frame can include only one video, but can not include multiple videos;

4) a frame can include only one attachment, but can not include multiple attachments;

5) a frame can include only one text, but can not include multiple texts;

6) a text can coexist with one file of any other types;

7) an image can coexist with an audio in a frame;

8) if a frame contains a video, except a text file, the frame can not include any files of other types; and 9) if a frame contains an attachment, except a text file, the frame can not include any files of other types.

Based on the principle above, a new SMIL file is constructed and is input to the next step to process;

step 5: integrally parsing the input SMIL file to obtain a slide sequence structure, wherein the slide sequence structure describes a playing layout of all the non-SMIL files and may include a frame or more frames of slides; each frame of slide describes the playing time of the frame, the multimedia file information of the frame and other attachment information; and step 6: inputting the non-SMIL file sequence obtained in step 1 and the slide sequence obtained in step 5 to the MMS player to play.

The MMS decoding method in the present disclosure applies key technologies including SMIL pre-parsing processing, SMIL adaptive selection and SMIL reconstruction, such that all the information in the MMS can be adaptively and completely displayed to a user even though the packaging styles of MMS data (such as, SMIL is contained, SMIL is not contained, SMIL is contained but with an incomplete description) are various, thereby avoiding the defects existing in the conventional method that partial file information might be lost or not all the MMS contents can be displayed to a user dynamically like slides. It can be seen that the MMS decoding in the present disclosure has high smartness and can greatly help MMS application to improve user experience; besides, the whole process is simple and quick, has higher processing efficiency and takes up a smaller system overhead.

The above is the further description of the present disclosure in combination with a specific preferable embodiment; the example is provided just for a better understanding and it should understand that the specific embodiment of the present disclosure is not limited to the description above. For those skilled in the art, various equivalent modifications or changes can be made to the present disclosure without departing from the conception of the present disclosure. These similar modifications or substitutes should be deemed to be included within the protection scope of the present disclosure.

The invention claimed is:

1. A Multimedia Messaging Service (MMS) decoding method, comprising the following steps of:
   A: parsing an original MMS data packet, acquiring all the non-Synchronized Multimedia Integration Language (SMIL) files in the original MMS data packet, and counting the number of all the non-SMIL files as a first non-SMII, file number;
   B: determining whether an SMIL file exists in the parsing result, when there exists an SMIL file, pre-parsing the SMIL file, obtaining the number of non-SMIL files described by the SMIL file, counting the number as a second non-SMIL file number, and executing step C;
   C: determining whether the first non-SMIL file number is equal to the second non-SMIL file number, when they are equal, taking the SMIL file in the parsing result as a formal SMIL file to be parsed, and executing step E;
   E: integrally parsing the formal SMIL file to be parsed, obtaining a data structure describing a playing layout of MMS, taking the obtained data structure and all the non-SMIL files obtained in step A as an MMS decoding result.

2. The method according to claim 1, wherein the step A specifically comprises:
   A1: parsing an original MMS data packet and acquiring all the files in the original MMS data packet; every time a file is acquired, determining a format of the file by checking a content-type field of the file and saving the file into a file body of a corresponding format;
   A2: acquiring all the non-SMIL files in the parsing result and counting the number of all the non-SMIL files as a first non-SMIL file number.

3. The method according to claim 2, wherein the format of the file comprises one or more types selected from a group consisting of a text format, an image format, an audio format, a video format and an attachment format.

4. The method according to claim 2, wherein for the non-SMIL files of different file formats, their respective file bodies are of list structures; all the non-SMIL file lists of different file formats are combined into a non-SMIL file sequence.

5. the method according to claim 1, wherein the data structure describing a playing layout of MMS is a slide sequence structure.

6. An MMS decoder, comprising:
   A file parsing module configured for parsing an original MMS data packet, acquiring all the non-SMIL files in the original MMS data packet and counting the number of all the non-SMIL files as a first non-SMIL file number;
   an SMIL pre-parsing module configured for determining whether an SMIL file exists in a parsing result, when an SMIL file exists, then pre-parsing the SMIL file, obtaining the number of non-SMIL files described by the SMIL file and counting the number as a second non-SMIL file number; when no SMIL file exists, then setting the second non-SMIL file number as zero;
   an SMIL decision unit configured for comparing the first non-SMIL file number with the second non-SMIL file number, and taking the SMIL file in the parsing result as a formal SMIL file to be parsed when the two numbers are equal;
   an SMIL file reconstruction unit configured for, when the first non-SMIL file number and the second non-SMIL file number are not equal, constructing an SMIL file according to all the non-SMIL files obtained in the file parsing module, and taking the constructed SMIL file as a formal SMIL file to be parsed;
   An MMS decoding output module configured for integrally parsing the formal SMIL file to be parsed, obtaining a data structure describing a playing layout of MMS, and taking the obtained data structure and all the non-SMIL files obtained in the file parsing module as an MMS decoding result.

7. The MMS decoder according to claim 6, wherein the file parsing module comprises:
   a parsing processing unit configured for parsing an original MMS data packet, every time a file is acquired, determining a format of the file by checking a content-type field of the file and saving the file into a file body of a corresponding format;
   A non-SMIL file acquisition unit configured for acquiring all the non-SMIL files in a parsing result and counting the number of all the non-SMIL files as a first non-SMIL file number.

8. The MMS decoder according to claim 7, wherein the format of the file comprises one or more formats selected from a group consisting of a text format, an image format, an audio format, a video format and an attachment format.

9. A mobile terminal including the MMS decoder according to claim 6.

10. The method according to claim 3, wherein for the non-SMIL files of different file formats, their respective file bodies are of list structures; all the non-SMIL file lists of different file formats are combined into a non-SMIL file sequence.

11. The method according to claim 2, wherein the data structure describing a playing layout of MMS is a slide sequence structure.

12. The method according to claim 3, wherein the data structure describing a playing layout of MMS is a slide sequence structure.

13. A mobile terminal including the MMS decoder according to claim 7.

14. A mobile terminal including the MMS decoder according to claim 8.

15. A Multimedia Messaging Service (MMS) decoding method, comprising the following steps of:
 A: parsing an original MMS data packet, acquiring all the non- Synchronized Multimedia Integration Language (SMIL) files in the original MMS data packet, and counting the number of all the non-SMIL files as a first non-SMIL file number;
 B: determining whether an SMIL file exists in the parsing result, when there does not exist an SMIL file, executing step D;
 D: constructing an SMIL file according to all the non-SMIL files obtained in step A and taking the constructed SMIL file as a formal SMIL file to be parsed;
 E: integrally parsing the formal SMIL file to be parsed, obtaining a data structure describing a playing layout of MMS, taking the obtained data structure and all the non-SMIL files obtained in step A as an MMS decoding result.

16. The method according to claim 15, wherein the step A specifically comprises:
 A1: parsing an original MMS data packet and acquiring all the files in the original MMS data packet; every time a file is acquired, determining a format of the file by checking a content-type field of the file and saving the file into a file body of a corresponding format;
 A2: acquiring all the non-SMIL files in the parsing result and counting the number of all the non-SMIL files as a first non-SMIL file number.

17. The method according to claim 16, wherein the format of the file comprises one or more types selected from a group consisting of a text format, an image format, an audio format, a video format and an attachment format.

18. The method according to claim 17, wherein in the step D, the constructing an SMIL file according to all the non-SMIL files obtained in step A is carried out in the following way:
 D1: determining a construction principle of an SMIL file, wherein the construction principle comprises: only one file of one file format can exist in a frame; a video file or an attachment file can only coexist with a text file in a frame;
 D2: constructing an SMIL file describing a playing layout of all the non-SMIL files according to the construction principle.

19. The method according to claim 16, wherein for the non-SMIL files of different file formats, their respective file bodies are of list structures; all the non-SMIL file lists of different file formats are combined into a non-SMIL file sequence.

20. The method according to claim 15, wherein the data structure describing a playing layout of MMS is a slide sequence structure.

21. The method according to claim 17, wherein for the non-SMIL files of different file formats, their respective file bodies are of list structures; all the non-SMIL file lists of different file formats are combined into a non-SMIL file sequence.

22. The method according to claim 18, wherein for the non-SMIL files of different file formats, their respective file bodies are of list structures; all the non-SMIL file lists of different file formats are combined into a non-SMIL file sequence.

23. The method according to claim 16, wherein the data structure describing a playing layout of MMS is a slide sequence structure.

24. The method according to claim 17, wherein the data structure describing a playing layout of MMS is a slide sequence structure.

25. The method according to claim 18, wherein the data structure describing a playing layout of MMS is a slide sequence structure.

26. A Multimedia Messaging Service (MMS) decoding method, comprising the following steps of:
 A: parsing an original MMS data packet, acquiring all the non- Synchronized Multimedia Integration Language (SMIL) files in the original MMS data packet, and counting the number of all the non-SMIL files as a first non-SMIL file number;
 B: determining whether an SMIL file exists in the parsing result, when there exists an SMIL file, pre-parsing the SMIL file, obtaining the number of non-SMIL files described by the SMIL file, counting the number as a second non-SMIL file number, and executing step C;
 C: determining whether the first non-SMIL file number is equal to the second non-SMIL file number, when they are not equal, executing step D;
 D: constructing an SMIL file according to all the non-SMIL files obtained in step A and taking the constructed SMIL file as a formal SMIL file to be parsed;
 E: integrally parsing the formal SMIL file to be parsed, obtaining a data structure describing a playing layout of MMS, taking the obtained data structure and all the non-SMIL files obtained in step A as an MMS decoding result.

27. The method according to claim 26, wherein the step A specifically comprises:
 A1: parsing an original MMS data packet and acquiring all the files in the original MMS data packet; every time a file is acquired, determining a format of the file by checking a content-type field of the file and saving the file into a file body of a corresponding format;
 A2: acquiring all the non-SMIL files in the parsing result and counting the number of all the non-SMIL files as a first non-SMIL file number.

28. The method according to claim 27, wherein the format of the file comprises one or more types selected from a group consisting of a text format, an image format, an audio format, a video format and an attachment format.

29. The method according to claim 28, wherein in the step D, the constructing an SMIL file according to all the non-SMIL files obtained in step A is carried out in the following way:
 D1: determining a construction principle of an SMIL file, wherein the construction principle comprises: only one file of one file format can exist in a frame; a video file or an attachment file can only coexist with a text file in a frame;
 D2: constructing an SMIL file describing a playing layout of all the non-SMIL files according to the construction principle.

30. The method according to claim 27, wherein for the non-SMIL files of different file formats, their respective file bodies are of list structures; all the non-SMIL file lists of different file formats are combined into a non-SMIL file sequence.

31. The method according to claim 26, wherein the data structure describing a playing layout of MMS is a slide sequence structure.

32. The method according to claim 28, wherein for the non-SMIL files of different file formats, their respective file bodies are of list structures; all the non-SMIL file lists of different file formats are combined into a non-SMIL file sequence.

33. The method according to claim 29, wherein for the non-SMIL files of different file formats, their respective file bodies are of list structures; all the non-SMIL file lists of different file formats are combined into a non-SMIL file sequence.

34. The method according to claim 27, wherein the data structure describing a playing layout of MMS is a slide sequence structure.

35. The method according to claim 28, wherein the data structure describing a playing layout of MMS is a slide sequence structure.

36. The method according to claim 29, wherein the data structure describing a playing layout of MMS is a slide sequence structure.

* * * * *